United States Patent [19]

Shiber

[11] 3,966,010
[45] June 29, 1976

[54] POWER DRIVEN SKI'S THROTTLE AND SHUT-OFF CONTROL

[75] Inventor: Samuel Shiber, Mundelein, Ill.

[73] Assignee: Saroy Engineering, Wheaton, Ill.

[22] Filed: June 16, 1975

[21] Appl. No.: 587,342

[52] U.S. Cl. .......................... 180/103 BF; 180/5 R; 280/11.11 E; 251/57; 60/533
[51] Int. Cl.² ........................................ B62M 27/02
[58] Field of Search .......... 180/103, 5 R, 1 G, 82 R, 180/77 R; 280/11.11 E; 115/70; 60/533, 562; 251/57; 74/513

[56] References Cited
UNITED STATES PATENTS

| | | | |
|---|---|---|---|
| 2,966,328 | 12/1960 | Burnworth | 74/513 X |
| 3,129,604 | 4/1964 | Hanson | 74/482 |
| 3,645,348 | 2/1972 | Thompson | 280/11.11 E |
| 3,734,230 | 5/1973 | Tanaka | 180/103 |
| 3,742,928 | 7/1973 | Albertson | 180/82 R |
| 3,812,813 | 5/1974 | Dickson | 115/70 |
| 3,853,192 | 12/1974 | Husted | 280/11.11 E |

*Primary Examiner*—Kenneth H. Betts
*Attorney, Agent, or Firm*—Samuel Shiber

[57] ABSTRACT

A hand operated hydrostatic throttle & shut-off switch for remotely transmitting signals from a skier's hand to a power-driven ski's engine, comprising of a hand operated master cylinder, a slave cylinder for activating the throttle and a flexible coiled tube through which throttle control and shut-off signals are transmitted between the hand and the engine.

8 Claims, 8 Drawing Figures

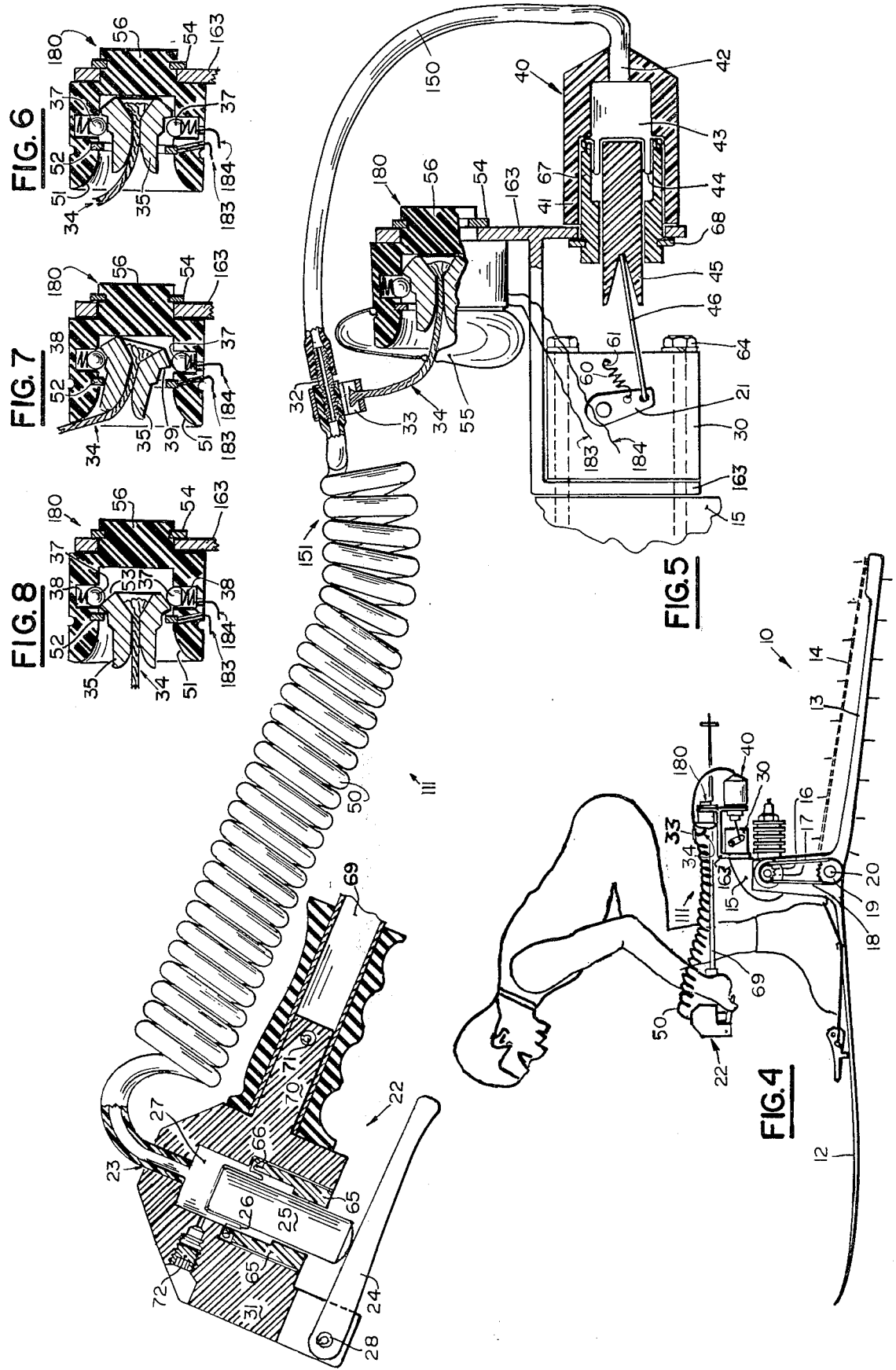

POWER DRIVEN SKI'S THROTTLE AND SHUT-OFF CONTROL

BACKGROUND OF THE INVENTION

A power-driven ski is relatively a new comer to the field of motorized winter sports. It provides unique and new ways of enjoying the snow covered outdoors, and it calls for some new and unique mechanisms to make "power-skiing" possible, convenient and safe.

As has been explained in Royce H. Husted's U.S. Pat. No. 3,853,192, issued on Dec. 10, 1974, which is herein incorporated by reference, a power-driven ski provides the skier, on one hand, with some challenges of down-hill skiing such as holding balance, steering and braking by body and skis manipulations, without being limited to a "one-way" skiing on an often crowded ski hill equipped with ski lifts, and, on the other hand, a power-driven ski provides the skier with the excitement of controlling his own propelling power, coupled with the freedom to roam over the snow-covered outdoors up or down hills, and especially over flat land as a snowmobile does, without imposing as large penalties of costs (purchasing & operating) and transportation.

At the same time, since power-skiing incorporates the fun of skiing and of snowmobiling into one sport, it also imposes on the power-skier the "chores" of skiing and of controlling the power-driven ski's engine power output, simultaneously.

Controlling the engine power, which in the case of an internal combustion engine is usually done in the form of varying the carburetor's throttle opening, poses unique problems, especially when the engine is mounted directly on the ski, as suggested in Husted's U.S. Pat. No. 3,853,192, column 2, lines 67 and 68.

While skiing, the feet are preoccupied and, any control functions have to be carried out by the hands. However, the hands are also partially preoccupied by the ski poles and, in addition, they are commonly used as "counter-weights" which the skier may throw upwards or sideways to maintain his balance. For example, commonly, when starting to power-ski, the skier may be thrusted forward by the power-driven ski, and attempt to maintain his balance by throwing his hands upwards above his head (as shown in FIG. 1 in a solid line). In contrast, when climbing a steep hill, the skier may be bending forward (note FIG. 1 in a phantom line) at which position his hands are in the vicinity of his boots and the power-driven ski's engine. The various positions and actions of the hands lead us back to note some of the unique problems that the throttle control has to accomodate; since, as mentioned, it must be hand operated, it has to follow the hand through all its gyrations and movements while the skier fights for his balance and, at the same time, the throttle control has to continuously transmit a steady signal to the engine. The throttle control must, therefore, be responsive to the relatively weak signal input and, to transmit this signal accurately and smoothly. (The importance of smooth and accurate throttle control can be visualised in the light of the above discussion, since it effects the smoothness and accuracy of the forward thrust generated by the power-driven ski, which effects the skier's ability to maintain balance).

In addition, the skier's hand may be either up above his head or, at the vicinity of his boot, i.e. it may be as far as ten feet from the engine or, as close as one foot, respectively. It is important that, while the hand is near the boot (and at all other times), no part of the throttle control is free to drag on the ground, as it may be damaged by the ski, interfere with the skier and cause his loss of balance. Further, the throttle control may be subjected to being sharply bent, twisted, as well as being exposed to snow, icing etc.

A second engine control function that should be provided at the skier's finger tips is the ability to shut off the engine. This should be done, for general safety considerations, and specifically for a case in which the throttle became stuck in an open position, or for a case in which the skier fell or, a case combining the two mishaps when the skier fell and the throttle became stuck. (It may be noted that such combined mishap is not as rare as one may assume since, on one hand, a wide open frozen throttle would often cause the skier's fall and, on the other hand, when a skier falls he may damage the mechanism and cause the throttle to be stuck in the open position).

SUMMARY OF THE INVENTION

The present invention relates to a throttle and shut-off control system for a power-driven ski's engine and, specifically, a power-driven ski having its engine mounted directly on the ski.

Briefly, the invention comprises of a master cylinder, preferably attachable to an upper end of a ski pole, a slave cylinder attached to the engine and adapted to effect its throttle opening and, a special tube assembly for mechanically and hydraulically connecting one cylinder to the other. In addition, the tube is adapted to carry through itself a shut-off command, either mechanically or, by wires supported thereby.

The tube is in the form of a helical extension spring and is, therefore, made of material which is, on the one hand, resilient enough to allow the extension spring to extend and retract and, on the other hand, a material stiff enough to maintain the cross section area constant enough so that when the tube acts as a spring its internal volume would not change and would not, thereby, effect the signal which the tube transmits hydraulically at all times from the master cylinder to the slave cylinder.

The master and slave cylinders contain rolling diaphragm mechanisms which allow translation of a mechanical signal into a hydraulic signal at the master cylinder and vice versa at the slave cylinder, very efficiently even at low temperatures. In addition, a rolling diaphragm provides hermetic seal and prevents loss of liquid over an extended period of time (in contrast, sliding piston and seals, as in a regular master cylinder arrangement, tend to develop substantial friction which have stick-slip characteristics and, in addition, tend to allow a certain leakage).

A liquid medium contained in the cylinders and the tube does the actual signal transmission between the cylinders. The liquid should obviously be compatible with the tube, the cylinder and the diaphragm materials and, in addition, it should have as low a viscosity as possible.

When the skier does not introduce a mechanical signal into the master cylinder the throttle control is in its free position and, the throttle of the engine's carburetor is closed. In response to the skier's signal the master cylinder displaces fluid through the tube assembly into the slave cylinder which, in turn, opens the throttle and also energizes a return spring whose function is to urge the system into its free position. The return spring force is chosen in proportion to the friction force in the system. When activating the throttle control, the skier has to overcome both the friction-generated forces and the return spring force, whose magnitude also depends on these friction forces. Therefore, it is essential to keep these friction forces to a minimum, since the force that a skier's finger can apply comfortably, over an extended period of time, is limited. That is why the low viscosity of the liquid medium and the usage of rolling diaphragms, which are practically frictionless, are essential. Furthermore, experience indicates that there are rather narrow design and dimensional constraints that have to be adapted while designing and constructing a throttle control according to the present invention, in order to achieve good results. For example, the maximum amount of volume of liquid to be displaced into the slave cylinder, in order to change the throttle position from fully closed to fully opened, should be below one cubic inch. Larger volumes will call for a large tube cross section and, thus, an increase in components' sizes, increasing friction and cumbersomeness. Further, as one may note, the design of the return spring has to take into consideration a case wherein the skier wants to release the throttle control while his hand is above his head, and the return spring has to overcome (in addition to the friction forces) a hydrostatic head of approximately seven feet. Hence, the larger the signal's volume the larger the return spring has to be, penalizing the skier's finger with higher force requirements. On the opposite end of the scale of parameters' choices, if one over-decreases the size of the signal's volume, he starts noticing that the swelling of the tube under the signal's pressure (and the smaller the signal's volume is, the higher the pressure) dissipates a large portion of the signal, up to a point of loss of effective signal transmission.

Drawing on my own experience, it has been observed that a signal volume of one half cubic inch, which was passed through nine feet of a polyurethane tube coiled into an extension spring of two inches mean diameter, gave good overall performance. The tube's outside diameter was one quarter of an inch and wall thickness was one sixteenth of an inch.

The engine used to propel the power-driven ski is a small gasoline internal combustion engine, of the type that is commonly used in chainsaws (for example, an engine currently available on the market delivers over 3.5HP while weighting approximately 6 pounds). Commonly, such engines incorporate an ignition circuitry that energizes a spark plug, and a switch means mounted on the engine to shut-off the engine by disabling the ignition circuit (numerous text books, repair manuals and other publications contain detailed information on the structure and function of small gasoline engines). Now, since, while power-skiing, a skier may fall (like in regular skiing) and may not always easily find or, even, physically reach the shut-off switch mounted on the engine and, since, in the process of falling (or, in some cases, as a reason for his falling) the throttle may be stuck in a wide open position (due to icing or, some other mechanical malfunction, for example), the tread on the posterior part of the ski, which provides the forward push, may continue to circulate forcefully around the posterior portion of the ski, endangering the skier. Therefore, it is preferred to provide an alternative means to shut-off the engine at the skier's finger tips access. The present invention shows how this can be done and, particularly, how it can be done economically and, without adding cumbersomeness, by incorporating an engine shut-off system in the throttle's control hardware.

The invention will be now illustrated in conjunction with the accompanying drawings.

BRIEF DESCRIPTION OF THE DRAWINGS

FIG. 4 is a side view of a skier on a power-driven ski incorporating a second embodiment of the present invention;

FIG. 5 is a sectional view of the second embodiment;

FIG 6 is a sectional view of a switch, which forms a part of the second embodiment, in an open position;

FIG. 7 is a sectional view of the switch in FIG. 6 in a first closed position; and FIG. 8 is a sectional view of the switch in FIG. 6 in a second closed position.

DETAILED DESCRIPTION OF THE DRAWINGS

Figure 1:
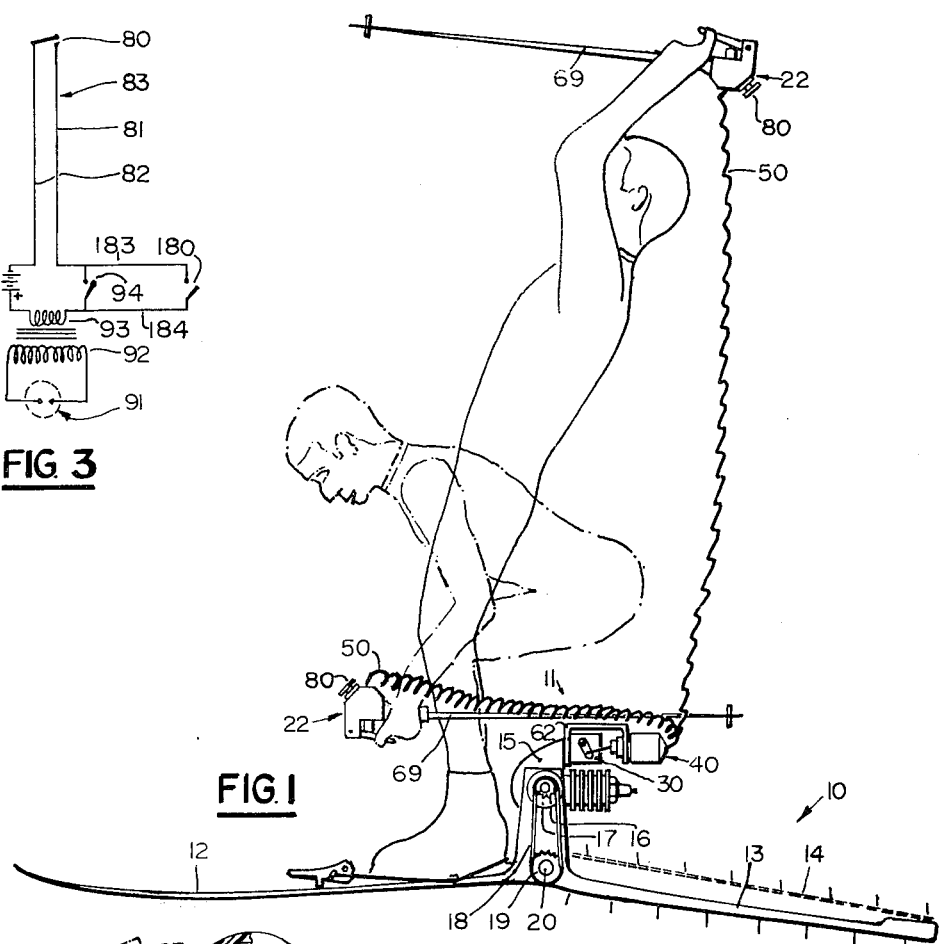
FIG. 1 is a side view of a skier on a power-driven ski incorporating a first embodiment of the present invention.

FIG. 1 illustrates a skier on a power-driven ski 10 which incorporates a first embodiment of the present invention 11.

For the convenience of the reader I will briefly describe the major components of the power driven ski:

It comprises an anterior ski portion 12 and a posterior ski portion 13. An endless tread 14 is circulatably supported around the posterior ski portion 13 and is driven by an internal combustion engine 15 through a centrifugal clutch 17 having a sprocket 16 which drives a chain 18 which drives a second sprocket 19 which drives a shaft 20 which drives a third sprocket (not shown), which drives the tread 14. The tread is adapted to engine snow packed under the posterior 13 and to, thereby, propel the power-driven ski 10. Further explanation of the power-driven ski, per se, can be found in Husted's U.S. Pat. No. 3.853,192.

Figure 2:
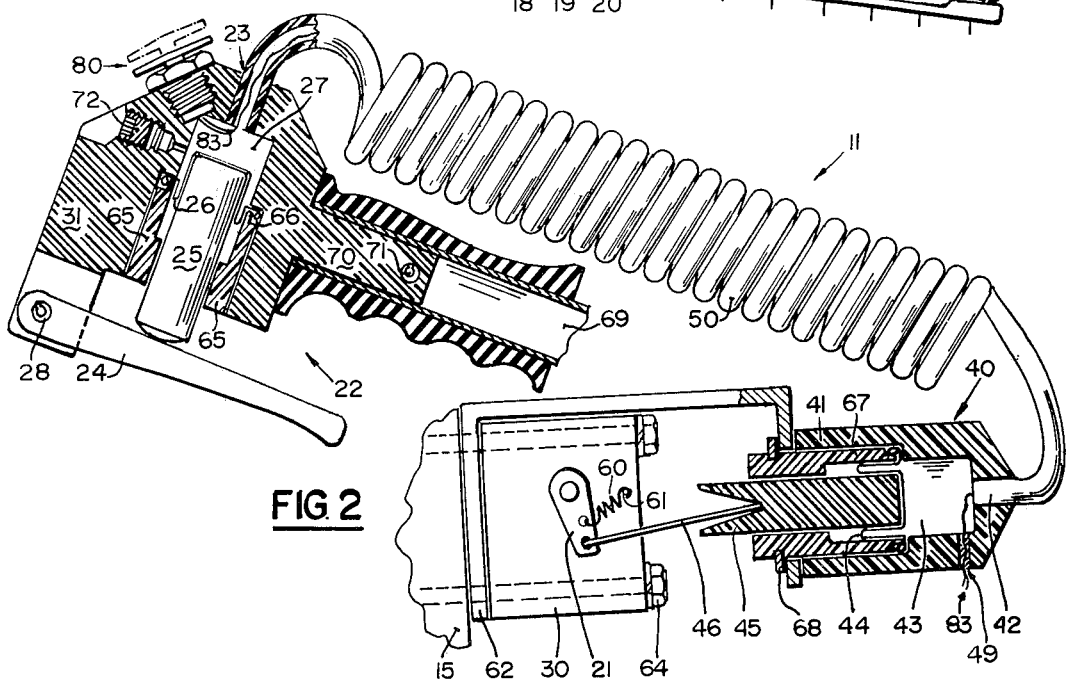
FIG. 2 is a cross sectional view of the first embodiment.

FIG. 2 illustrates a power-driven ski's hand-operated throttle control and shut-off means 11, for transmitting signals from a skier's hand to a throttle 21 of a carburetor 30 of the engine 15 and to the engine's electrical ignition system, comprising:

A hydraulic master cylinder 22 having a housing 31 which defines an output port 23, for displacing liquid through this port in response to a mechanical signal in the form of the skier's finger pressure on the trigger 24 which, in turn, pushes piston 25 and rolling diaphragm 26 into an expandable chamber 27 which is filled with said liquid. The trigger 24 is pivotedly connected to housing 31 by means of spring pin 28;

a hydraulic slave cylinder 40 having body 41 which defines an input-port 42 for receiving the liquid into an expandable chamber 42. When the liquid enters the chamber 43 it pushes rolling diaphragm 44 and piston 45 which converts the received liquid into a mechanical signal. Piston 45 pushes rod 46 which activates throttle 21;

a tube 50, which connects the output-port of cylinder 22 and the input-port of slave cylinder 40, is made of resilient material, such as polyurithane for example, which has been helically coiled into an extension spring. This tube 50 always maintains a minimum length path between the master and slave cylinders and, thereby, prevents the tube from dragging on the ground and from getting entangled with the skis.

It should be understood that if a skier's leg is in the way, the tube assembly which is essentially a light extension spring, as well as a liquid conduit, may wrap around the leg etc.. However, it will still keep any available part of the tube coiled and, thus prevent extensive dangerous slackness, while, at the same time, continuously transmitting the signal between the master and the slave cylinders.

Polyurethane may be a suitable tube material since it is both tough and flexible at low temperatures that a power-driven ski is likely to experience.

Some additional details illustrated in FIG. 2 are:

A helical extension spring 60 which is anchored to the carburetor 30 through a pin 61 and acts to return the throttle to its free position. A bracket 62 that holds the slave cylinder 40 is clamped between the engine 15 and the carburetor 30 (the engine and the carburetor are connected to each other by bolts 64). The master cylinder 22 is assembled by adhering a sleeve 65 to the housing 31 in shown position. The sleeve 65 pinches and seals on a bead 66 which is formed around the open end of the diaphragm 26. The slave cylinder is assembled similarly with sleeve 67 in which a groove is formed for a snap ring 68.

Numeral 69 indicates a ski pole to which a stub 70 extending from housing 31 of master cylinder 22 is secured with spring pin 71. A plug 72 serves to fill the system with liquid.

A switch 80 is screwed into body 31 and is adapted to make or to brake an electrical connection between two terminals 81 and 82 that comprise wire 83 and provide electrical conductance through themselves. Wire 83 is a light flexible electrical wire that passes through chamber 27 into tube 50, and exits tube 50 into chamber 43. It then passes a sealed hole filled with epoxy 49, formed in body 41 of the slave cylinder and connects into the electrical ignition circuitry of engine 15, so that the skier can shut-off the engine through switch 80 by pushing it from the position shown in the phantom line in FIG. 2 to the position shown in solid line in FIG. 2. It may be worth noting that one may use wire 83 as part of the ignition circuit (note FIG. 3), in which case the engine will be operative when switch 80 will be closed (making contact), or, one may use wire 83 to shorten the ignition circuit in which case the engine will be operative when switch 80 is open.

It is understandable that one may use tube 50 to support electrical wire 83 in several modified forms, for example, wire 83 can be molded into the side of tube 50, or attached to its side or, it can even run freely in the center of the extension spring that tube 50 forms. However, in all these cases wire 83 can be said to run along tube 50 and to obtain support from it without adding cumbersomeness to the usage of the power-driven ski as a whole. In contrast, separate wire which would run independently would add additional cumbersomeness.

One disadvantage in making wire 83 a part of the ignition circuit is that it may deteriorate the circuit performance and reliability. However, the scheme of shortening the ignition circuit does not have the same reliability of being able to shut-off engine 15 after the skier experienced a serious accident, during which tube 50 and wire 83 may have been torn. Therefore, it is the designer's choice and his considerations which of the schemes to employ.

Figure 3:
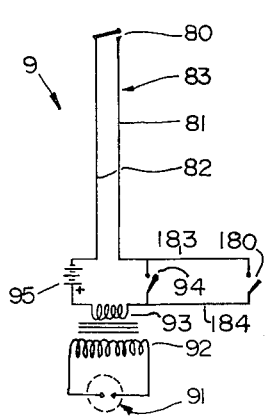
FIG. 3 shows a schematic wiring of a shut-off switch to an engine-ignition circuit.

FIG. 3 shows schematically a simplified engine-ignition-circuit 9 incorporating shut-off switch 80 of the first embodiment and switch 180 of the second embodiment. The circuit includes spark plug 91 connected to secondary winding 92 in which voltage is induced by primary winding 93 which is connected in series to a set of points 94, to battery 95 and to shut-off switch 80. It can be readily understood that when switch 80 is open the primary circuit is disrupted and, therefore, the whole ignition circuit 9 becomes inoperative. It is also understandable that, when the switch 180 is closed, it shortens the points 94 and disables the circuit in a different manner. The circuit of FIG. 3 is used to illustrate both modes of disablement of the circuit. However, it is obvious that either mode is sufficient and, in practice, only one of these modes — or an equivalent mode — is expected to be used.

FIG. 4 illustrates a skier on a power-driven ski 10 which incorporates a second embodiment of the present invention 111.

FIG. 5 illustrates a second embodiment of a power-driven ski's hand operated throttle control and shut-off means 111. The second embodiment is similar to the first embodiment in the portions that relate to the throttle control (therefore, the explanaton of the first embodiment, that relates to the hydraulic portion of the invention, applies as well to the second embodiment. It may be noted that in the second embodiment same numerals have been used to indicate same parts as in the first embodiment).

The second embodiment comprises;

A hydraulic master cylinder 22, a hydraulic slave cylinder 40, a tube assembly 151, hydraulically connecting the master and slave cylinders 22 and 40, respectively, one to the other. The tube assembly is made of a coiled section 50 and a non-coiled section 150, which are connected hydraulically and mechanically one to the other by a barbed hollow connector 32.

In addition, the tube assembly is mechanically anchored to an electrical switch 180, located in the engine's vicinity, secured to a bracket 163 by a snap ring 54, which is designed to switch from its normal position in response to abnormally strong forces transmitted to it through the tube assembly 151. Such forces, which are larger than the forces that are normally generated by the various hand maneuvers of the skier's hand, as previously discussed, are indications to the switch that the skier is attempting to shut-off the engine by transmitting such a mechanical signal through the tube.

The swtich 180 is specifically designed to resist switching during normal skiing by having two balls 37 which are urged by two springs 38 against a first ramp 39 formed on a toggle 35. However, when the force signal that the skier transmits through the tube assembly 151, which is in turn transmitted to the toggle 35 through a cable assembly 34, exceeds a certain value the ball (or balls) 37 is forced to climb on the first ramp 39 and the toggle 35 snaps to a position shown in FIG. 7 or to a position shown in FIG. 8 and, in either case, it closes the circuit between the wires 183 and 184 by making contact between the retaining ring 52 to which the wire 183 is connected and the one ball 37 to which the wire 184 is connected through one of the springs 38. This continuity shortens the points 94 and disables the ignition circuit 9. The switch 180 is designed to be multidirectionally activated, that is it will switch in response to a predetermined level of force applied to it through the cable assembly 34, practically in any direction. (It may be noted that even when the toggle 35 is pulled backward — or leftward, as illustrated on the various FIGS. — the cable sliding over the funneled hole opening 51 will translate this to a sideways pulling force which will activate the switch 180). The multidirectional activation of the switch 180 is important, since the relationship between the ski and skier, after he has fallen, is almost unpredictable, especially if the ski has been released at its binding, as modern skis often do or, if a skier's foot got twisted or even broken. Another favourable aspect of the second embodiment, which relates to such accidents, is that if the ski is thrown away from the skier, as a free projectile, it is possible that the tube assembly 151 will be torn or yank the ski pole out of the skier's hand, but in either case it is likely that before this happens the switch 180 will be switched and will shut-off the engine. A dust and snow boot 55, made of thin flexible plastic, prevents from snow entering and interfering with the switch's action.

From all the above said it is understandable that in order to operate the second embodiment all the skier has to do is to pull the tube assembly 151, preferably by grabbing the tube itself with his hand that does not operate the throttle. This preference is since the skier has to stretch the tube assembly 151 beyond the amount that it may be stretched during skiing and, to do so, he has to grab the tube approximately in its middle. As a result of such overstretching, force will be exerted on the toggle 35 and cause it to snap, as previously discussed (and as shown in FIG. 7 or FIG. 8) and, short-out the points 94. (It may be noted that the toggle 35, the ball 37, the spring 38 and, the retaining ring 52, are made of electrically conductive metal parts, while a switch housing 56 is made of electrically isolating material). The toggle will remain at this position due to the balls' 37 pressure on a rear ramp 53 formed on the toggle 35. To reset the switch 180 the skier has to center the toggle 35 and/or push it backwards into the switch 180, as shown in FIG. 6.

While the present invention has been illustrated by one embodiment it is understood that various modifications and substitutions can be made without departing from the spirit of the invention or the scope of the claims.

I claim:

1. In a power-driven ski, a hand operated throttle control for transmitting a signal from a skier's hand to a throttle of an engine of said power-driven ski, comprising in combination:
    a. A hydraulic master cylinder having an output part for displacing liquid through said output port in response to a mechanical signal from a skier's hand,
    b. a hydraulic slave cylinder connected to said engine having an input port for receiving said liquid and translating it to a mechanical signal for actuating said throttle of said engine, and
    c. a resilient helically coiled extension spring tube assembly connecting said output and input ports, said assembly maintaining a minimum length pass between said master and slave cylinders while allowing one to move freely relative to the other, without interfering with the signal being transmitted between said cylinders.

2. A throttle control as in claim 1, wherein said cylinders incorporate a rolling diaphragm mechanism to define an expandable chamber therein.

3. A throttle control as in claim 1, wherein said tube is made of polyurethane material 4. In a power-driven ski, a combined hand operated throttle control and shut-off system for transmitting signals from a skier's hand to an engine of said power-driven ski and for shutting-off said engine, comprising in combination:
    a. A hydraulic master cylinder having an output port for displacing liquid through said output port in response to a mechanical signal from a skier's hand,
    b. a hydraulic slave cylinder connected to said engine having an input port for receiving said liquid and translating it to a mechanical signal for actuating said throttle of said engine, and
    c. a resilient helically coiled extension spring tube assembly connecting said output and input ports, said assembly maintaining a minimum length pass between said master and slave cylinders while allowing one to move freely relative to the other, without interfering with the signal being transmitted between said cylinders, said tube assembly adapted to communicate through itself a shut-off signal to said engine in addition to carrying the hydraulic signal from said master to said slave cylinder.

5. The system of claim 4 wherein said shut-off signal transmitted through said tube is a mechanical signal.

6. The system of claim 5 wherein said mechanical signal is transmitted to a multidirectional switch which is adapted to disable the ignition circuit of said engine.

7. The system of claim 4 wherein said shut-off signal is transmitted through said tube is in the form of an electrical conductance.

8. The system of claim 7 wherein said shut-off signal is transmitted through electric wires running along said tube.

* * * * *